United States Patent [15] 3,670,573
Kroemer [45] June 20, 1972

[54] APPARATUS FOR MEASURING THUMB AND FINGER FORCE

[72] Inventor: Karl Heinrich Eberhard Kroemer, Yellow Springs, Ohio

[73] Assignee: The United States of America as represented by the Secretary of the United States Air Force

[22] Filed: Nov. 18, 1970

[21] Appl. No.: 90,551

[52] U.S. Cl. ................................................73/379, 272/68
[51] Int. Cl. .........................................................G01l 5/02
[58] Field of Search ..........................73/379, 380; 272/67, 68

[56] References Cited

UNITED STATES PATENTS 3,216,259 11/1965 Bendix......................................73/380

Primary Examiner—Richard C. Queisser
Assistant Examiner—Arthur E. Korkosz
Attorney—Harry A. Herbert, Jr. and Richard J. Killoren

[57] ABSTRACT

An apparatus for measuring the force exerted by a thumb or finger of a test subject, having a hand grip with a thumb pressure well being positioned on a beam adjacent the hand grip. The beam has a reduced section with strain gages thereon, with the output of the strain gages being applied to a recording device. Adjustments are provided to adjust the relative angular and vertical positions of the thumb pressure well with respect to the hand grip.

4 Claims, 7 Drawing Figures

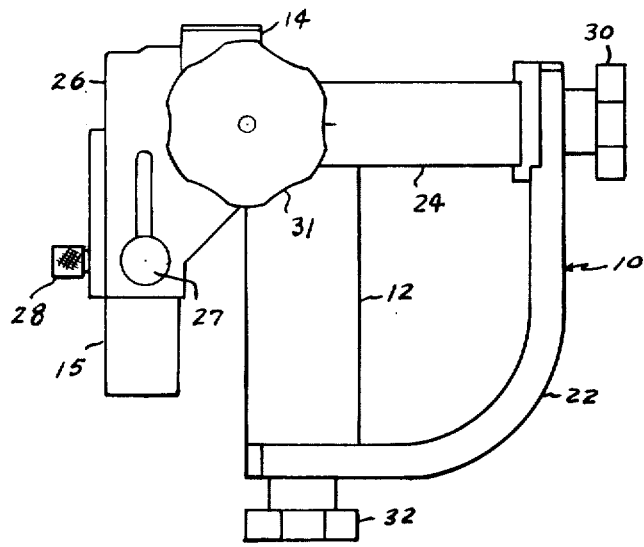
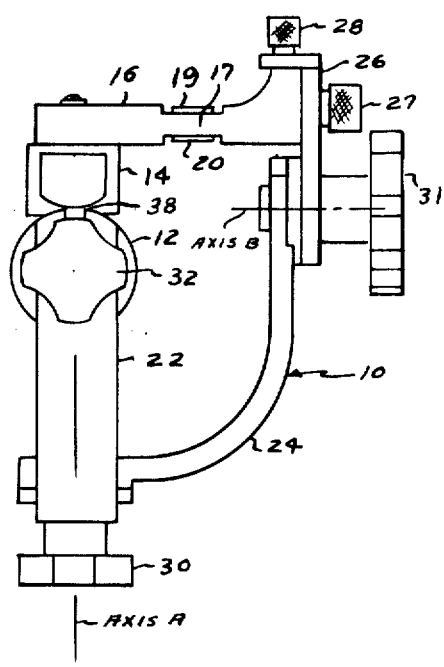
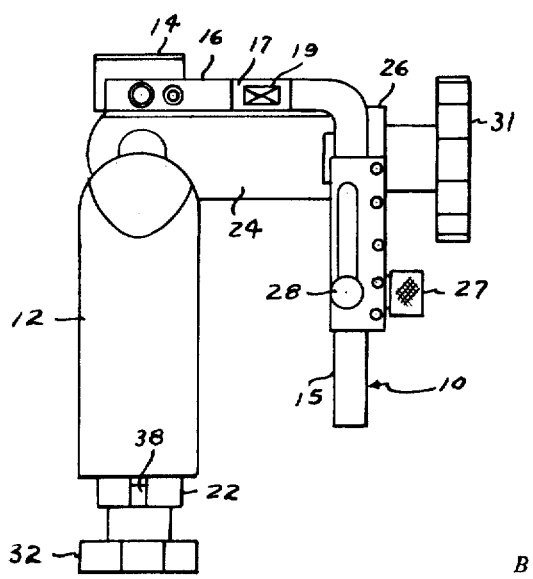

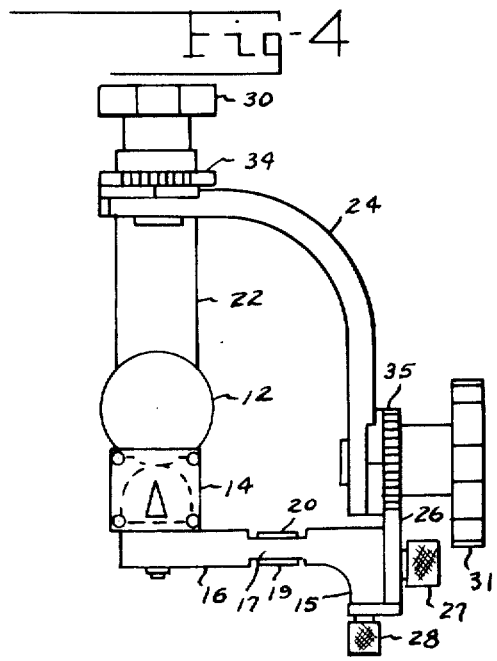
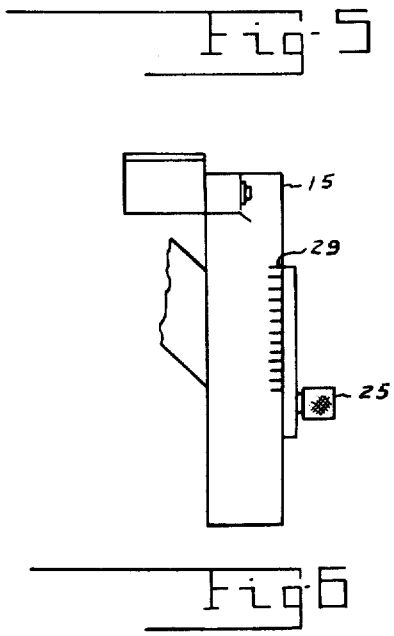
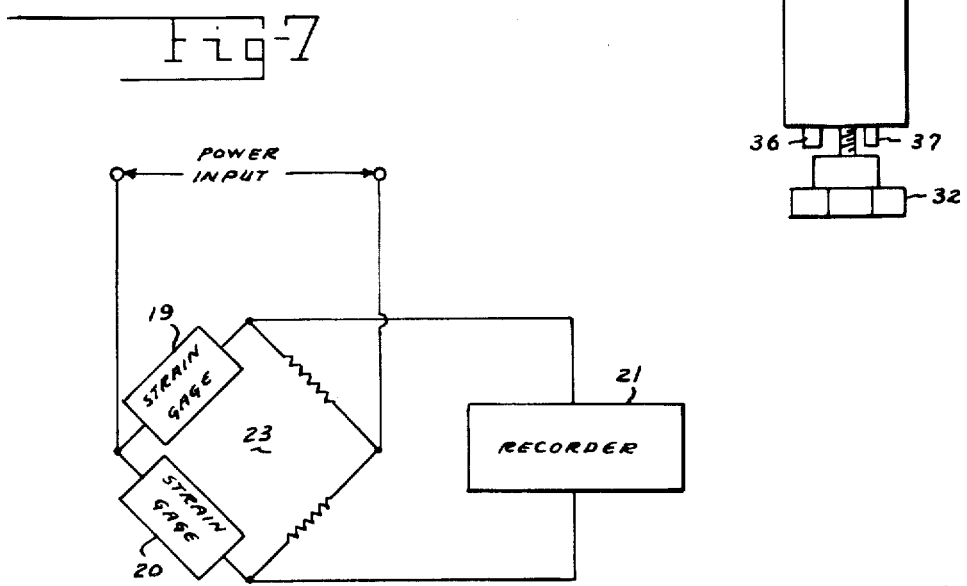

APPARATUS FOR MEASURING THUMB AND FINGER FORCE

BACKGROUND OF THE INVENTION

In making digit strength surveys such as in measuring the force exertable with the thumbs or other digits, as for example, to be applied to hand operated control systems, apparatus is needed which defines the force vector in terms of magnitude, direction and location and which gives the relative position of the digits and the hand. Such a system must provide force readings without interfering force inputs from other parts of the body. The apparatus must be capable of adapting to any hand size. While various hand force measuring apparatus is available, none has been available which is satisfactory for this purpose.

BRIEF SUMMARY OF THE INVENTION

According to this invention a device is provided which may be adjusted to the size of the hand of the person being tested. The device has a hand grip to be held by the test subject with a thumb pressure well being positioned on a beam adjacent the hand grip. The beam has a reduced section with strain gages thereon to sense the bending of the beam under the force exerted on the pressure well. The output of the strain gages is applied to an indicator such as a recorder.

IN THE DRAWINGS

FIG. 1 is a side view of a finger force measuring device according to the invention.

FIG. 2 is a bottom view of the device of FIG. 1.

FIG. 3 is a left side view of the device of FIG. 1.

FIG. 4 is a top view of the device of FIG. 1.

FIG. 5 is a partially cut away view of the beam support for the device of FIG. 1.

FIG. 6 shows a side view of the hand grip used with the device of FIG. 1.

FIG. 7 is a schematic diagram partially in block form of the recording circuit for the device of FIG. 1.

DETAILED DESCRIPTION OF THE INVENTION

Reference is now made to FIG. 1 of the drawing wherein reference number 10 shows a finger force measuring device having a hand grip 12. A thumb force well 14 is secured to a beam 16 positioned adjacent the hand grip. The beam 16 has a reduced section 17 with strain gages 19 and 20 positioned on opposite sides of the reduced section of beam 16. The output of strain gages 19 and 20 is applied to a recording apparatus 21 by means of a Wheatstone bridge circuit 23 as shown in FIG. 7. The beam 16 is supported on the hand grip 12 by means of brackets 22, 24 and 26. The beam 16 has a beam support 15 secured to bracket 26. Adjusting knobs 27 and 28 which when released permit vertical adjustment of beam 16 with respect to the hand grip 12. Position markings 29 are provided on the beam support 15 as shown in FIG. 5. Angular adjustments between brackets 22 and 24 and between brackets 24 and 26 are made by loosening knobs 30 and 31, respectively. Angular position markings 34 and 35 are provided adjacent knobs 30 and 31.

In the operation of the device the hand grip 12 is grasped by the person being tested so that axis A points forward approximately in line with the forearm. The radial side of the forefinger is positioned even with the top of the hand grip 12. Knobs 27 and 28 are loosened so that the distance between hand grip and thumb force well 14 can be adjusted to the length of the thumb of the person being tested. Force is exerted against the wall of the well adjacent beam 16. The deformation of the beam is then recorded on the recorder 21.

By loosening knob 31, bracket 26 can be rotated about axis B, so that tests may be made from a position where the thumb is straight up to a place where the thumb is bent forward so that its distal segment is perpendicular to the hand grip. Such forward bending of the thumb occurs virtually only in the distal and proximal interphalangeal joints. No significant relocating in the metacarpal-phalangeal joint can take place due to the pressure between the thenar and the hand grip surface.

Rotation of bracket 24 around axis A by loosening knob 30 brings about corresponding lateral positions in the metacarpal-phalangeal joint of the thumb, without affecting the positions in the more distal joints. By combining adjustments around axes A and B the thumb can be positioned in a variety of positions for tests with the angles being indicated on scale markings 34 and 35. Various size hand grips may be provided to accommodate different hand sizes. Each hand grip 12 has positioning pins 36 and 37, shown in FIG. 6, which engage slot 38 and are secured by knob 32.

Measurements of other digits can be made in a similar manner. The device may be calibrated by applying known forces to the pressure well, such as by the use of weights.

There is thus provided an apparatus for measuring the force exertable with a thumb or one of the other digits which gives the relative position of the digits with respect to the hand.

I claim:

1. An apparatus for measuring the force exerted by one of the digits of the hand of a test subject, comprising: a hand grip; a beam, having one end positioned adjacent the hand grip; a pressure well connected to said beam at the end adjacent the hand grip; means for connecting the other end of said beam to said hand grip; said connecting means including means for rotating said beam around an axis perpendicular to the longitudinal axis of said hand grip; said connecting means including means for adjusting the position of said pressure well along a line perpendicular to the longitudinal axis of said beam; said beam including means for sensing pressure exerted by a digit within said pressure well and means, connected to said pressure sensing means for recording the pressure exerted within the pressure well by one of the digits of the test subject.

2. The device as recited in claim 1 wherein said connecting means includes an additional means for rotating said beam around an axis perpendicular to said first mentioned axis and angularly adjustable with respect to a plane passing through the axis of the grip and said first mentioned axis.

3. The device as recited in claim 2 including means positioned adjacent said rotating means for indicating the angular rotation of the beam around the first and second axes.

4. The device as recited in claim 3 wherein said beam has a reduced section with a pair of strain gages being positioned adjacent the reduced section to provide the sensing of the pressure exerted by a digit within said pressure well; said strain gages forming a part of a Wheatstone bridge supplying an input to said recording means.

* * * * *